United States Patent
Fu et al.

[11] Patent Number: 5,827,560
[45] Date of Patent: Oct. 27, 1998

[54] PROCESS FOR PRODUCING COLD WATER SOLUBLE TEA EXTRACT

[75] Inventors: Xiaoping Fu, Epalinges, Switzerland; Richard Tien-Szu Liu, Worthington, Ohio; Lawrence Nickle, Marysville, Ohio; Rachid Rahmani, Columbus, Ohio

[73] Assignee: Nestec S.A., Vevey, Switzerland

[21] Appl. No.: 840,157

[22] Filed: Apr. 14, 1997

[51] Int. Cl.$^6$ ........................................................ A23F 3/34
[52] U.S. Cl. ............................ 426/435; 426/427; 426/597
[58] Field of Search ................................... 426/597, 435, 426/427, 471

[56] References Cited

U.S. PATENT DOCUMENTS

| | | | |
|---|---|---|---|
| 3,163,539 | 12/1964 | Barch | 99/77 |
| 3,787,590 | 1/1974 | Borders et al. | 426/366 |
| 3,950,553 | 4/1976 | Gasser et al. | 426/262 |
| 3,992,983 | 11/1976 | Gasser et al. | 99/287 |
| 4,156,024 | 5/1979 | Husaini | 426/257 |
| 4,472,441 | 9/1984 | Clark et al. | 426/435 |
| 4,680,193 | 7/1987 | Lunder et al. | 426/597 |
| 5,139,802 | 8/1992 | Liu et al. | 426/263 |
| 5,250,317 | 10/1993 | Liu et al. | 426/597 |

*Primary Examiner*—Anthony J. Weier
*Attorney, Agent, or Firm*—Pennie & Edmonds LLP

[57] ABSTRACT

A continuous process for producing a tea extract which contains solubilized tannins and which has good color. Tea solids are extracted from tea leaves using an extraction liquid to provide a tea extract containing soluble tea solids and insoluble tannins. The insoluble tannins are separated from the tea extract and oxidized and solubilized under raised temperature conditions to provide a solubilized tannin liquor. The solubilized tannin liquor is either returned to the extraction liquid during extraction of tea solids or added to the tea extract after separation of the insoluble tannins. The tea extract which contains solubilized tea tannins is collected.

17 Claims, No Drawings

PROCESS FOR PRODUCING COLD WATER SOLUBLE TEA EXTRACT

Field of the Invention

This invention relates to a process for producing a tea extract in which insoluble solids, for example tannins, are solubilized to improve the cold water solubility of these insoluble solids. The invention also relates to tea extracts and to tea products produced using the process.

BACKGROUND TO THE INVENTION

Aqueous extracts obtained from tea contain a number of solids, of which some are soluble in hot water only. An example is the tannin fraction which contains polyphenolic compounds and complexes of polyphenolic compounds with other compounds. For convenience and because it is customary in the art to do so, these cold-water, insoluble solids are referred to in this specification as "tannins"; even though they might not all be tannins in a strict chemical sense. These solids are also known in the art as "tea creams". When cold water beverages are prepared from tea, the tannins usually precipitate out; forming undesirable layers and also turning the beverage cloudy. Cloudy beverages are usually unacceptable to consumers.

One attempt to deal with the problem has been to simply remove the tannins from the tea extract prior to further processing of the extract. Although this solves the problem, it creates others. In particular, since the tannins provide a substantial part of the overall flavor of the tea beverage, beverages produced from the tannin-depleted extract lack flavor. Also, the tannins contain high concentrations of matter which provide the tea extract with color. Therefore tannin depleted extracts usually have an unacceptably light color.

Another approach has been to remove the tannins from the tea extract, solubilize them to make them soluble in cold water, and then return them to the extract. One example of this approach is described in U.S. Pat. No. 3,163,539. Here the tannins are first removed from the tea extract by cooling of the extract to precipitate the tannins. The tannins are then subjected to oxidation under highly basic conditions. Thereafter, the treated tannins are recombined with the tea extract from which they were removed. The mixture is then acidified to return it to the normal pH of an untreated tea extract. The mixture is then processed as usual into tea powder or a tea concentrate in which the solids are soluble in cold water. The problem with this approach is that residues of the alkali and acid used in the process are present in the final product. These residues are undesirable in foodstuffs.

To get around this problem, it has been suggested in U.S. Pat. No. 3,787,590 that the use of an oxidizing agent in the oxidation step avoids the need to raise the pH of the tannins. The oxidizing agents suggested are hydrogen peroxide, ozone, oxygen, mixtures of these gases with air, and the like. This process has also been improved upon, as is described in U.S. Pat. No. 4,156,024, by the use of an oxidation catalyst in conjunction with the oxidizing agents. However for both processes, it has been found that, during oxidation, acidic substances are produced which reduce the efficiency of these processes since the oxidation of tea tannins is a base catalyzed reaction. Hence, small amounts of base must still be added when the processes are used commercially; which again must be neutralized. Therefore these processes, although reducing the amounts of acid and base used, do not do away with their use completely.

It is therefore clear that a need exists for a process of producing a tea extract containing solubilized tannins which is simple, effective, and which produces a product which has little or no unnatural contaminants and which has acceptable color.

SUMMARY OF THE INVENTION

It is therefore an object of this invention to provide a process for producing a tea extract of acceptable color which contains solubilized tannins and which does not require the use of basifying or acidifying agents.

Accordingly, in one aspect, this invention provides a process for producing a tea extract which contains solubilized tannins, the process comprising:

i) extracting tea solids from tea leaves using an extraction liquid to provide a tea extract containing soluble tea solids and insoluble tannins;

ii) separating the insoluble tannins from the tea extract to obtain clarified tea extract;

iii) oxidizing and solubilizing the tannins under raised temperature conditions to provide a solubilized tannin liquor; and iv) adding the solubilized tannin liquor to the extraction liquid during extraction of tea solids from tea leaves in step i), or to the clarified tea extract of step ii) to obtain a fortified tea extract and separating insoluble tannins from the fortified tea extract to obtain a clarified tea extract; and v) collecting the clarified tea extract of step ii) or step iv) to obtain a tea extract which contains solubilized tea tannins.

It is surprisingly found that by oxidizing the insoluble tannins and then returning the solubilized tannins to the extraction process or to the clarified tea extract, a tea extract may be obtained which contains solubilized tannins but little or no insoluble tannins. Also the tea extract has a good flavor. Further, no chemical acidifying or basifying agents are used and hence the tea extract does not contain contaminants. Moreover, the solubilized tannins have a dark red color so that the tea extract better approximates the color of a natural tea beverage. The prior art solubilization processes often produce black tannins which then need to be bleached; further adding to the contamination. Hence the invention provides a significant improvement in the art.

The insoluble tannins are preferably oxidized using a gaseous oxidizing agent so that residues of the agent in the tea extract can be minimized. Suitable examples of gaseous oxidizing agents are ozone, oxygen, and mixtures of these gases with air. Oxygen gas is especially preferred.

The temperature at which the insoluble tannins are oxidized is preferably about 80° C. to about 130° C.; more preferably about 102° C. to about 110° C. The insoluble tannins are preferably oxidized at a pressure of about 1.5 MPa to about 2.0 MPa.

The process may also include the step of adding green tea leaves to the insoluble tannins prior to oxidizing the insoluble tea solids. It is found that the green tea leaves may remove acids during the oxidation reaction and may further increase the yield of solubilized tannins. Preferably the amount of green tea leaves used in the process comprises at least 20%, for example from 20% to 50%, by weight of the total amount of insoluble tannins and green tea leaves combined. More preferably, the green tea leaves comprise from 25% to 40%, particularly 25% to 30%, by weight of the total amount of insoluble tannins and green tea leaves combined.

The process may further comprise the step of removing at least a portion of the acids from the solubilized tannin liquor prior to adding the solubilized tannin liquor to the extraction liquid. The acids may be removed, for example, by ultrafiltration of the solubilized tannin liquor, by steam stripping of the solubilized tannin liquor, or by contacting the solubilized tannin liquor with spent tea leaves. In particular the process may comprise separating solubilized tannin liquor into a first and a second stream, removing acids from the solubilized tannin liquor in the first stream, and combining the first stream with the second stream prior to adding the solubilized tannin liquor to the extraction liquid.

Preferably the tea solids are extracted from the tea leaves in a series of inter-connected fixed-bed reactors; the solubilized tannin liquor being added to the extraction liquid between one or more adjacent pairs of fixed-bed reactors of the series.

Preferably the solubilized tannin liquor is added to the extraction liquid immediately prior to the fixed-bed reactor containing the freshest of the tea leaves.

The invention also provides a tea extract produced by the process defined above.

In another aspect, this invention provides a soluble tea powder containing solubilized tannins and which is free of chemical acidifying and basifying agents, the soluble tea powder when dissolved in water at about 10° C. at a concentration of about 0.25% by weight providing a beverage having an NTU of less than about 40 and a color of about 40 to 55 when determined by light transmittance at a wave length of 524 nm.

DETAILED DESCRIPTION OF THE INVENTION

Embodiments of the invention are now described by way of example only. The process is particularly suitable for producing tea products which contain solubilized tannins obtained from extracts of mixtures of black and green tea; but it may also be used on black tea extracts and oolong tea extracts. Oolong tea is green tea which has been enzymatically oxidized to some extent. Green tea is tea which has been freshly picked and then treated, usually heat treated, to inactivate enzymes in the tea which oxidize the green tea to black tea. Black tea is tea which has been fully enzymatically oxidized.

The extent to which the tannins have been solubilized can be determined by measuring the turbidity of a cold beverage produced from a mixture of the solubilized tannins and soluble tea solids. In producing the cold beverage, the concentration of the mixture of the solubilized tannins and the soluble tea solids is selected to be about 0.25% by weight, which corresponds to the usual concentration of these components in a tea beverage. Also, the ratio of the solubilized tannins to the soluble tea solids is selected to approximate that found in a conventional tea beverage. The temperature of the beverage is set to about 10° C. The turbidity of the beverage is then measured using a suitable turbidimeter, for example a Hatch Ratio Turbidimeter obtainable from the Hatch Company, Loveland, Colo., USA, and the results reported in Nephelometric Turbidity Units (NTU). An NTU value of less than about 40 indicates a beverage containing little or no insoluble tannins.

The color of the tea beverage should be in the range of about 40 to about 55 when measured using a spectrophotometer at a wave length of 524 nm. A Model Spectronic 20D spectrophotometer obtained from Milton Roy Company, Rochester, N.Y., USA is particularly suitable. Preferably the color of the beverage is about 45 to about 49.

To produce a tea extract suitable for use in tea beverages, tea leaves must first be extracted with hot water to produce a raw tea extract. This can be done in several ways as is known in the art.

One suitable method is to extract the tea leaves in a series of fixed bed reactors. Fresh tea leaves are placed into the first reactor of the series and fresh extraction water is introduced into the last reactor. The last reactor contains the most extracted tea leaves. The extraction water flows from the last reactor, through each reactor in turn, and then through the first reactor. After an extraction cycle, usually of about 10 to about 30 minutes, the flow of extraction water is terminated. Then a reactor containing fresh tea leaves is connected to the series of reactors as the first reactor while the last reactor is disconnected from the series reactors and emptied. What was previously the second last reactor becomes the last reactor. The process is then repeated by introducing fresh extraction water into the last reactor. In each cycle, the extract leaving the first reactor is collected as the tea extract.

Another method which is used is that described in U.S. Pat. No. 3,992,983. Here the tea is slurried with hot water and then run through a vertical column which has a perforated circumferential wall. Hot water for extraction is then run down the outside of the perforated column, within a larger column concentric with the perforated column. Solids soluble in hot water, including the tannins, diffuse into the hot water for extraction.

The tea extracts obtained using these processes usually contain volatile aroma and flavor components which are very susceptible to degradation or loss during processing. Therefore it is common practice to remove these components at this point to minimize their exposure to adverse conditions. This is usually carried out using a steam stripper; the volatiles being carried off in the steam. The steam is then condensed and the volatiles isolated. The isolated volatiles are usually returned to the tea extract later in the process.

The stripped tea extract usually has a tea solids concentration in the region of about 1% to about 10% by weight at this point. To simplify processing, the stripped tea extract is usually concentrated to raise the concentration of tea solids to about 5 to about 15% by weight, for example about 8% by weight.

The insoluble tannins are then separated from the soluble tea solids by cooling the tea extract to below about 15° C., usually to about 5° to 10° C. This causes the insoluble tannins to form solid particles which can then be removed by filtration or by settling. The type of separation technique used is not critical and may be selected to give the best economic performance under the conditions chosen. For smaller scale operations, a centrifuge filter usually operates adequately. The filtrate, which is the tea extract produced by the process, usually contains about 6% by weight of soluble tea solids and solubilized tannins.

The insoluble tannins are then collected, if necessary washed, and suspended in water to provide a tannin liquor of a concentration of at most about 15% by weight; preferably less than about 4 to about 5% by weight. The tannin liquor is then subjected to an oxidation reaction under raised temperature and pressure conditions to solubilize the insoluble tannins. The oxidation reaction may be carried out in any reactor suitable for carrying out oxidation reactions at elevated pressures and temperatures. Stirred tank reactors, which have heating jackets, and column reactors are particularly suitable. If the process is a continuous process, a column reactor may be used.

The temperature at which the oxidation reaction is carried out is preferably at least about 80° C., more preferably at least about 100° C.; for example from 102° C. to 110° C. Temperatures less than about 80° C. are not preferred since they lead to incomplete oxidation or prolonged times for complete oxidation. Temperatures greater than about 130° C. are not preferred since these temperatures, although effective, may cause irreversible denaturation of the tannins.

The oxidation reaction is preferably carried out under raised pressure; for example more than about 1 MPa and preferably more than about 1.5 MPa. For example, the pressure may be about 1.7 MPa to about 2.0 MPa. Particularly suitable is a pressure of about 1.7 MPa. Pressures less than 1.0 MPa lead to prolonged oxidation times or incomplete oxidation while pressures greater than 2.0 MPa, although effective, do not provide any additional advantages for the additional cost.

The amount of the oxygen needed to oxidize the tannins will depend upon the process parameters chosen, the type of tea used, the level of oxidation desired and commercial considerations. However the amount is not critical and is readily determined; particularly since substantially the same amount as used in the art, under similar conditions, may be used. For example, the amount of oxygen introduced may be in the range of about 4 moles of $O_2$/kg of tannins to about 18 moles of $O_2$/kg of tannins. Usually a small excess of oxygen will be used. For better temperature control, the oxygen gas may be heated to the reaction temperature before being introduced into the reactor.

It will be appreciated that it is not necessary to use oxygen as the oxidizing agent since the choice of oxidizing agent is not critical; any of the oxidizing agents known in the art for oxidizing tannins, such as ozone, mixtures of oxygen or ozone gases with air, and hydrogen peroxide, may also be used.

The residence time of the tannin liquor in the reactor is selected such that sufficient oxidation of the tannins is achieved. Usually a residence time of about 10 minutes to 2 hours is sufficient. For batch reactions, if desired, the progress of the reaction may be monitored so that the reaction may be stopped once adequate oxidation has been achieved. This may be done taking samples of the reaction mixture during the reaction. The samples may then be analyzed to determine the solubility of the tannins, for example. The solubility may be determined by measuring the turbidity of the sample once dissolved in cold water at 10° C. and at a concentration of about 0.25% tea extracts. In this way, the optimum reaction time may be determined for each reaction and the reaction time stopped at that point.

If desired, green tea leaves, preferably ground, may be added to the tannin liquor prior to oxidation. It is found that the green tea leaves may assist the oxidation reaction, probably by reducing acid concentration in the tannin liquor. The amount of green tea leaves used preferably falls within the range 20% to 50% by weight of the total amount of tannin in the tannin liquor and the green tea leaves combined. Afterwards, the green tea leaves may be separated off by filtration.

The solubilized tannin liquor may then be subjected to a physical process to remove acids. Although not essential, it is found that these physical processes improve the color of the tea extract. Since the solubilized tannin liquor is recycled into the flow of the extraction liquid, removal of acids from the solubilized tannin liquor results in a reduction of acids in the tea extract. Tea extracts with higher pH's have a darker, more acceptable color.

The acids may be removed in a number of ways. One suitable process is to subject the solubilized tannin liquor to ultrafiltration to collect particles of sizes of less than 1 µm; preferably of molecular weight less than about 2000; for example about 1000. Suitable utrafilters are commercially available; for example from Millipore Corp., Desal Systems, etc. By using ultrafiltration in this way, it is found that about 20 to about 30% of titratable acids may be removed. If it is desired to recover most of the tannin solids which pass through the ultrafilter, the permeate from the ultrafiltration may be subjected to nanofiltration to collect particles of molecular weight of about 2 to about 500. Again suitable nanofilters are commercially available; for example from Desal Systems. The retentates from the ultrafiltration and nanofiltration are then combined. The combination contains substantially all the tannin solids (for example above about 95%) and a reduced amount of titratable acids, on the order of about 15% to about 25%, when compared to the solubilized tannin liquor.

Another suitable physical process to remove acids is to subject the solubilized tannin liquor to steam stripping. This may be done by introducing the solubilized tannin liquor into the top of a suitable stripping column; for example a sieve tray column. Steam is introduced into the bottom of the column and caused to flow counter-current to the solubilized tannin liquor to strip off acids. It is found that both the pH and the concentration of titratable acids in the stripped liquor is reduced.

Yet another suitable physical process to remove acids is to contact the solubilized tannin liquor with of spent tea leaves. It is found that both the pH and the concentration of titratable acids in the filtered liquor is reduced.

The solubilized tannin liquor is then either introduced into the flow of extraction liquid that is being used to extract the tea leaves or is added to the tea extract after separation of the insoluble tannins. Introducing the solubilized tannin liquor into the flow of extraction liquid is particularly suited to extraction processes which use a series of extraction reactors; particularly fixed bed reactors. However the process is also practicable with other extraction reactors. If fixed bed reactors are used, the solubilized tannin liquor may be introduced into the flow of extraction liquid between any two of the fixed bed extraction reactors. However best results are obtained when the solubilized tannin liquor is introduced into the flow of extraction liquid immediately prior to the fixed bed reactor which contains the fresh tea leaves.

If the solubilized tannin liquid is added to the tea extract after separation of the insoluble tannins, the mixture should be subjected to further separation techniques to remove any insoluble tannins which may remain. The separation techniques described above may be used.

The tea extract obtained after removal of the insoluble tannins is processed as desired to provide a liquid tea concentrate or a soluble tea powder. The liquid tea concentrate or soluble powder may then be packaged and stored as desired. The extracts, in powder or liquid form, may then be used to produce hot or cold tea beverages as is conventional. However, the tea extract is particularly suitable for use in iced tea type beverages.

An advantage of the process is that there is no build up of residual insoluble tannins in the system. After several cycles required to reach steady state conditions, it is found that the amounts of insoluble tannins removed from the tea extract is substantially constant.

Specific examples of the invention are now described by way of example only. In the following examples, all percentages are by weight unless otherwise indicated. The NTU's are determined using a model 18900, Hatch Ratio Turbidimeter obtained from the Hatch Company, Loveland, Colo., USA. All color measurements are made with a Model Spectronic 20D spectrophotometer operated at a wave length of 524 nm.

EXAMPLE 1

A tea mixture consisting of 50% green tea, 15% Indonesian tea, and 35% Argentine tea is extracted in a series of 6 fixed bed reactors. Fresh tea leaves are placed into the first reactor and fresh extraction water is introduced into the last reactor. The last reactor contains the most extracted tea leaves. The extraction water flows from the last reactor, through each reactor in turn, and then through the first reactor. After an extraction cycle of about 15 minutes, the flow of extraction water is terminated. A reactor containing fresh tea leaves is connected to the series of reactors as the first reactor while the last reactor is disconnected from the series reactors. What was previous the second last reactor becomes the last reactor. The process is then repeated by introducing fresh extraction water into the last reactor. In each cycle, the extract leaving the first reactor is collected as the tea extract.

The tea extract is transferred to a steam stripper where the volatile components (the aromatics) are removed in a conventional manner. The stripped extract is then concentrated and then cooled to 7° C. The cooled extract is centrifuged to give insoluble tannins and a clarified tea extract containing about 6% by weight of soluble tea solids.

About 3.5 kg of the insoluble tannins are added to about 170 kg of water to provide a tannin liquor. The acid concentration is determined by titration and the pH is taken. The tannin liquor is transferred to a column reactor of 0.2 m diameter and 5.5 m length and recirculated in the column reactor along with about 1 kg of green tea leaves. The temperature throughout is 103° C. and the pressure is 1.5 MPa. About 18 $m^3$ of oxygen is introduced into the column reactor during this time. After about 90 minutes, the solubilized tannin liquor is separated from the green tea leaves by filtration.

The solubilized tannin liquor is then cycled through an ultrafiltration membrane, rated at 1000 molecular weight, until about 118 kg of permeate is removed. The retentate is collected and its acid concentration is determined by titration and its pH is taken. The pH value of the retentate is about the same as that of the tannin liquor but the acid concentration by titration is about 27% lower.

The retentate is pumped into the flow of extraction liquid through the series of fixed bed reactors; between the third and fourth reactors. The process is repeated for several cycles until steady state is achieved.

The clarified tea extract at steady state is diluted to a concentration of about 0.25% of soluble tea solids and the NTU is measured. An NTU of about 25 to about 40 is obtained indicating very good solubilization of the insoluble tannins. The color of the diluted tea extract is determined to be about 50 to 55. The diluted tea beverage is tasted and found to have a good flavor.

EXAMPLE 2

The process of example 1 is repeated except that the permeate from the ultrafiltration step is subjected to nanofiltration (rated at 2 to 500 molecular weight). The retentate is collected and combined with the retentate from the ultrafiltration step. The pH value of the combined retentate is about the same as that of the tannin liquor but the acid concentration by titration is about 15% to about 22% higher than that of example 1 when only ultrafiltration is used. Also, about 97% of all insoluble solids originally in the tannin liquor are present in the combined retentate.

The clarified tea extract is diluted to a concentration of about 0.25% of soluble tea solids and the NTU and color is measured. The NTU and color of the diluted tea extract are about the same as the diluted tea extract of example 1. The diluted tea beverage is tasted and found to have a good flavor.

EXAMPLE 3

The process of example 2 is repeated except that no green tea leaves are recycled in the column reactor with the tannin liquor. The clarified tea extract, when diluted to a concentration of about 0.25% of soluble tea solids, has a NTU and color about the same as the diluted tea extract of example 2. The diluted tea beverage is tasted and found to have a good flavor.

EXAMPLE 4

A solubilized tannin liquor is prepared as described in example 1. However, instead of subjecting the solubilized tannin liquor to ultrafiltration, the solubilized tannin liquor is introduced into the top of a sieve tray column at a rate of about 11.4 kg/minute. About 1.3 kg/minute of steam introduced into the bottom of the column and caused to flow counter-current to the solubilized tannin liquor to strip off acids. The pH of the solubilized tannin liquor prior to stripping is about 3.6 while the pH of the stripped liquor is about 3.8. However the acid concentration by titration of the stripped liquor is not appreciably reduced.

The stripped liquor is pumped into the flow of extraction liquid through the series of fixed bed reactors; between the second and first reactors. The process is repeated until steady state is achieved.

The clarified tea extract at steady state is diluted to a concentration of about 0.25% of soluble tea solids and the NTU is measured. An NTU of less than about 40 is obtained indicating very good solubilization of the insoluble tannins. The color of the diluted tea extract is determined to be about 50 to 55. The diluted tea beverage is tasted and found to have a good flavor.

EXAMPLE 5

The process of example 4 is repeated except that, instead of subjecting the solubilized tannin liquor to steam stripping, the solubilized tannin liquor is contacted with washed, spent tea leaves for about 15 to 30 minutes. The weight ratio of tannin solids to spent dry tea leaves is about 1:1. Water at about 60° C. is added to the mixture. The solubilized tannin liquor is separated from the spent tea leaves by decantation. The decanted liquor is pumped into the flow of extraction liquid through the series of fixed bed reactors; between the second and first reactors. The process is repeated until steady state is achieved.

The clarified tea extract at steady state is diluted to a concentration of about 0.25% of soluble tea solids and the NTU is measured. An NTU of less than about 40 is obtained indicating very good solubilization of the insoluble tannins. The color of the diluted tea extract is determined to be about 50 to 55. The diluted tea beverage is tasted and found to have a good flavor.

EXAMPLE 6

Insoluble tannins and clarified tea extract are produced as described in example 1. Water is added to the insoluble tannins to provide a solids concentration of about 2% and the resulting tannin liquor is fed into the bottom of a column reactor at a flow rate of about 4.5 kg per minute. The column reactor has a diameter of about 0.2 m and a length of about 5.5 m. Oxygen is fed into the column reactor, at a flow rate of about 0.029 m$^3$/minute, through sintered metal rods located at the bottom of the column reactor and at about 1.5 m up. The temperature is about 103° C. and the pressure is about 1.5 MPa. The tannin liquor has a residence time of about 30 minutes in the column reactor prior to leaving through an outlet adjacent the top.

A portion of the solubilized tannin liquor is cycled through an ultrafiltration membrane, rated at 1000 molecular weight. The retentate is collected and combined with the remaining solubilized tannin liquor and the mixture pumped into the flow of extraction liquid through the series of fixed bed reactors; between the second and first reactors. The process is repeated until steady state is achieved.

The clarified tea extract at steady state is diluted to a concentration of about 0.25% of soluble tea solids and the NTU is measured. An NTU of less than about 40 is obtained indicating very good solubilization of the insoluble tannins. The color of the diluted tea extract is determined to be about 45 to 49. The diluted tea beverage is tasted and found to have a good flavor.

EXAMPLE 7

Solubilized tannin liquor is prepared as described in Example 1. However, instead of subjecting the solubilized tannin liquor to ultrafiltration, the solubilized tannin liquor is added to the clarified tea extract. The mixture is subjected to secondary centrifugation to remove insoluble tannins which form in the mixture to provide a clarified tea extract and insoluble tannins. These insoluble tannins are added to insoluble tannins from fresh tea extract and the insoluble tannin mixture is solubilized as described in example 1.

This process is repeated with steady state being established in terms of insoluble tannins being formed. The clarified tea extract obtained from the secondary centrifugation is diluted to a concentration of about 0.25% by weight of soluble tea solids. The diluted tea beverage is clear and has good color.

We claim:

1. A process for producing a tea extract which contains solubilized tannins, the process comprising:
   i) extracting tea solids from tea leaves using an extraction liquid to provide a tea extract containing soluble tea solids and insoluble tannins;
   ii) separating the insoluble tannins from the tea extract to obtain a clarified tea extract;
   iii) oxidizing and solubilizing the tannins under raised temperature conditions to provide a solubilized tannin liquor; and
   iv) adding the solubilized tannin liquor to the extraction liquid during extraction of tea solids from tea leaves in step i); and
   v) collecting the clarified tea extract of step ii) to obtain a tea extract which contains solubilized tea tannins.

2. A process according to claim 1 in which the tea solids are extracted from the tea leaves in a series of inter-connected fixed-bed reactors; the solubilized tannin liquor of step iv) being added to the extraction liquid between one or more adjacent pairs of fixed-bed reactors of the series.

3. A process according to claim 2 in which one of the fixed-bed reactors contains fresh tea leaves and the solubilized tannin liquor is added to the extraction liquid immediately prior to the fixed-bed reactor containing the fresh tea leaves.

4. A process according to claim 1 in which the insoluble tannins are oxidized using a gaseous oxidizing agent.

5. A process according to claim 4 in which the gaseous oxidizing agent is selected from ozone, oxygen and mixtures of these gases with air.

6. A process according to claim 1 in which the temperature at which the insoluble tannins are oxidized is about 80° C. to about 130° C.

7. A process according to claim 6 in which the insoluble tannins are oxidized at a pressure of about 1.5 MPa to about 2.0 MPa.

8. A process according to claim 1 further comprising the step of removing acids from at least a portion of the solubilized tannin liquor of step iv) prior to adding the solubilized tannin liquor to the extraction liquid.

9. A process according to claim 8 in which the acids are removed by ultrafiltration of the solubilized tannin liquor, by steam stripping of the solubilized tannin liquor, or by contacting the solubilized tannin liquor with spent tea leaves, or combinations thereof.

10. A process according to claim 1 further comprising separating solubilized tannin liquor of step iv) into a first and a second stream, removing acids from the solubilized tannin liquor in the first stream, and combining the first stream with the second stream prior to adding the solubilized tannin liquor to the extraction liquid.

11. A process according to claim 10 in which the acids are removed by ultrafiltration of the solubilized tannin liquor, by steam stripping of the solubilized tannin liquor, or by contacting the solubilized tannin liquor with spent tea leaves, or combinations thereof.

12. A process for producing a tea extract which contains solubilized tannins, the process comprising:
    i) extracting tea solids from tea leaves using an extraction liquid to provide a tea extract containing soluble tea solids and insoluble tannins;
    ii) separating the insoluble tannins from the tea extract to obtain a clarified tea extract;
    iii) oxidizing and solubilizing the tannins under raised temperature conditions to provide a solubilized tannin liquor;
    iv) removing acids from at least a portion of the solubilized tannin liquor; and
    v) adding the solubilized tannin liquor to the extraction liquid during extraction of tea solids from tea leaves in step i); and
    vi) collecting the clarified tea extract of step ii) to obtain a tea extract which contains solubilized tea tannins.

13. A process according to claim 12 in which the tea solids are extracted from the tea leaves in a series of inter-connected fixed-bed reactors; the solubilized tannin liquor of step v) being added to the extraction liquid between one or more adjacent pairs of fixed-bed reactors of the series.

14. A process according to claim 13 in which one of the fixed-bed reactors contains fresh tea leaves and the solubilized tannin liquor is added to the extraction liquid immediately prior to the fixed-bed reactor containing the fresh tea leaves.

15. A process for producing a tea extract which contains solubilized tannins, the process comprising:
    i) extracting tea solids from tea leaves in a series of inter-connected fixed-bed reactors using an extraction liquid to provide a tea extract containing soluble tea solids and insoluble tannins;

ii) separating the insoluble tannins from the tea extract;

iii) oxidizing and solubilizing the tannins under raised temperature conditions to provide a solubilized tannin liquor; and iv) adding the solubilized tannin liquor to the extraction liquid between one or more adjacent pairs of fixed-bed reactors of the series during extraction of tea solids from tea leaves in step i); and v) collecting the tea extract of step ii) which contains solubilized tea tannins.

16. A process according to claim 15 further comprising the step of removing acids from at least a portion of the solubilized tannin liquor prior to adding the solubilized tannin liquor to the extraction liquid.

17. A process according to claim 16 in which the acids are removed by ultrafiltration of the solubilized tannin liquor, by steam stripping of the solubilized tannin liquor, or by contacting the solubilized tannin liquor with spent tea leaves, or combinations thereof.

* * * * *